US006556126B1

(12) United States Patent
Imazuka et al.

(10) Patent No.: US 6,556,126 B1

(45) Date of Patent: Apr. 29, 2003

(54) WIRELESS RECORDING MEDIUM, GATE SYSTEM & TRANSACTIONS SYSTEM

(75) Inventors: Katsuo Imazuka, Kanagawa-ken (JP); Hisashi Yoshida, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/515,710

(22) Filed: Feb. 29, 2000

(30) Foreign Application Priority Data

Mar. 11, 1999 (JP) .......................................... 11-064592

(51) Int. Cl.[7] ......................... B60R 25/00; G05B 19/00; G06F 7/00; G08B 29/00; H04B 1/00

(52) U.S. Cl. ........................ 340/5.7; 340/7.55; 235/382

(58) Field of Search ............................... 340/7.55, 7.56, 340/7.61, 5.7, 5.8, 7.58; 235/382, 380, 381, 378; 705/13

(56) References Cited

U.S. PATENT DOCUMENTS

| | | | | | |
|---|---|---|---|---|---|
| 5,397,883 | A | | 3/1995 | Miyashita | 235/382 |
| 5,559,312 | A | * | 9/1996 | Lucero | 235/380 |
| 5,574,269 | A | * | 11/1996 | Mori et al. | 235/380 |
| 5,615,110 | A | * | 3/1997 | Wong | 395/238 |
| 5,831,547 | A | * | 11/1998 | Ohtsuki et al. | 340/825.54 |
| 6,070,146 | A | * | 5/2000 | Mimata | 705/13 |

* cited by examiner

*Primary Examiner*—Michael Horabik
*Assistant Examiner*—Nam Nguyen
(74) *Attorney, Agent, or Firm*—Foley & Lardner

(57) ABSTRACT

A wireless recording medium has a RAM to store gate data, a transmitting portion to transmit the gate data stored in the RAM to an automatic gate apparatus, a receiving portion to receive data showing the process contents from the automatic gate apparatus, and a displaying portion to display the using contents of the automatic gate apparatus based on the data showing the process contents received by the receiving portion.

13 Claims, 13 Drawing Sheets

IN THE CASE OF USING A COMMUTATION TICKET

IN THE CASE OF USING AN SF CARD

WIRELESS RECORDING MEDIUM, GATE SYSTEM & TRANSACTIONS SYSTEM

BACKGROUND OF THE INVENTION

1. Field of the Invention

The present invention relates to a gate system comprising automatic gate apparatus installed at, for instance, the entrance to platforms of a railway station, etc. and a wireless recording medium and a transaction system comprising the above-mentioned wireless recording medium and a charge processor to performs the transaction of article according to money data recorded in a wireless recording medium.

2. Description of the Related Art

In recent years, automatic gate apparatus are installed for the automatic gate processing of railroad tickets at railway stations of transport facilities. The automatic gate apparatus reads magnetic data recorded on inserted railroad tickets, judges right or wrong of passage through gates and performs such processes as punching, printing, etc. when necessary.

Further, there are also automatic gate apparatus that performs the gate processing using non-contact type cards utilizing the wireless communication or wireless device (hereinafter, called wireless cards) instead of magnetic railway tickets where data is recorded by magnetism. In the case of such an automatic gate apparatus, data recorded on a wireless card is read and written by making the wireless communication with a wireless card. Further, when data recorded on a wireless card is read through the wireless communication with a wireless card, an automatic gate apparatus judges approval/disapproval of passage through the gate. When the approval of passage is judged by this judgement, a user is able to pass through an automatic gate apparatus. However, when the passage is disapproved, the doors provided to the automatic gate apparatus are closed and a user is blocked to pass through the gate and the disapproval of passage is presented by a display or a voice so that a user is able to recognize it.

However, in the case of an automatic gate apparatus coping with wireless cards, when a person (a user) carrying a wireless card uses the automatic gate apparatus, as the wireless card has no function to have a user recognize the use of the wireless card, the user is not able to judge whether the wireless card could be properly used.

Further, when a pre-paid card (SF card; Stored Fare Card) that is inserted directly into an automatic gate apparatus and processed is used, the using data of the remainder of money, etc. are printed so that user is able to check the content of use. However, when a wireless card having a function as SF card is used, it is required to check the content of use by utilizing a dedicated device that is installed at a station, etc. and the content of use cannot be readily checked from a wireless card when it is used.

SUMMARY OF THE INVENTION

It is an object of the present invention to provide a wireless recording medium, a gate system and a transaction system capable of easily recognizing the content of use of a wireless recording medium.

According to the present invention, there is provided a wireless recording medium for communicating with an automatic gate apparatus including communication means for communicating with the wireless recording medium storing gate data; first processing means for processing the gate data received by the communication means; and second processing means for transmitting a processed contents after executing the gate data processed by the first processing means. The wireless recording medium comprises storage means for storing gate data; transmission means for transmitting the gate data stored in the storage means to the communication means of the automatic gate apparatus; receiving means for receiving the processed gate data transmitted from the second processing means of the automatic gate apparatus; and displaying means for displaying the processed data received by the receiving means.

Further, according to the present invention, there is provided a gate system comprising a wireless recording medium that records gate data and an automatic gate apparatus that executes a gate processing by a wireless communication with the wireless recording medium. The automatic gate apparatus comprises communication means for executing the wireless communication with the wireless recording medium; first processing means for executing a gate processing based on the gate data from the wireless recording medium received by the communication means; and second processing means for transmitting data showing a content of illegal use to the wireless recording medium by the communication means when the wireless recording medium is illegally used when the gate processing is executed by the first processing means. The wireless recording medium comprises storage means for accumulating and storing data showing contents of an illegal use received when the data transmitted by the second processing means of the automatic gate apparatus is received; and displaying means for reading out data showing the accumulated contents of illegal use from the storage means and displaying a history of illegal use.

Further, according to the present invention, there is provided a gate system. The gate system comprises a first and second automatic gate apparatus connected each other through communication circuits, which receive gate data through a wireless communication with a wireless recording medium recording at least ID code and the gate data, judge an approval/disapproval of entrance, and transmit the result of judgement to a wireless recording medium. The first automatic gate apparatus comprises first communication means for executing the wireless communication with the wireless recording medium in a first communication range; first processing means which receives gate data from the wireless recording medium through the wireless communication with the wireless recording medium in the first communication range by the first communication means and when the entrance is approved based on the received gate data, for transmitting the entrance data to the wireless recording medium; and transmission means for transmitting the ID code of the wireless recording medium to which the entrance data is transmitted by the first processing means to the second automatic gate apparatus via the communication circuit. The second automatic gate apparatus comprises second communication means for executing the wireless communication with the wireless recording medium in a second communication range; judging means for judging whether the ID code of the wireless recording medium is the same as the ID code transmitted from the first gate apparatus when entrance data is recorded on the wireless recording medium through the wireless communication with the wireless recording medium in the second communication range by the second communication means; and second processing means for executing the entrance processing based on the gate data of the wireless recording medium disregarding the entrance data transmitted at the time of entrance processing by the first processing means of the first automatic gate apparatus when both ID codes are judged to be the same by the judging means.

Further, according to the present invention, there is provided a transaction system comprising a wireless recording medium that is used in a gate processing executed by an automatic gate apparatus and records gate data having at least money data and a charge processor that executes the transactions of articles based on the money data recorded in the wireless recording medium. The charge processor comprises input means for inputting a charge of article; communication means for executing a wireless communication with the wireless recording medium; judging means for receiving money data from the wireless recording medium by the communication means and judging whether the remainder of money on the wireless recording medium after deducted a charge of article that is input by the input means from the remainder of money of the received money data is below the specified amount; suspending means for suspending the transactions of article when judged that the remainder of money is below a specified amount by the judging means; approving means for approving the transactions of article when judged that the remainder of money is above the specified amount by the judging means; and third processing means for transmitting transaction data including at least a charge of article to the wireless recording medium by the wireless communication means. The wireless recording means comprises receiving means for receiving the transaction data transmitted by the third processing means of the charge processor; and changing means for changing the remainder of money of the money data according to the transaction data received by the receiving means.

DETAILED DESCRIPTION OF THE PREFERRED EMBODIMENTS

Preferred embodiments of the present invention will be described below with reference to the attached drawings.

Figure 1:
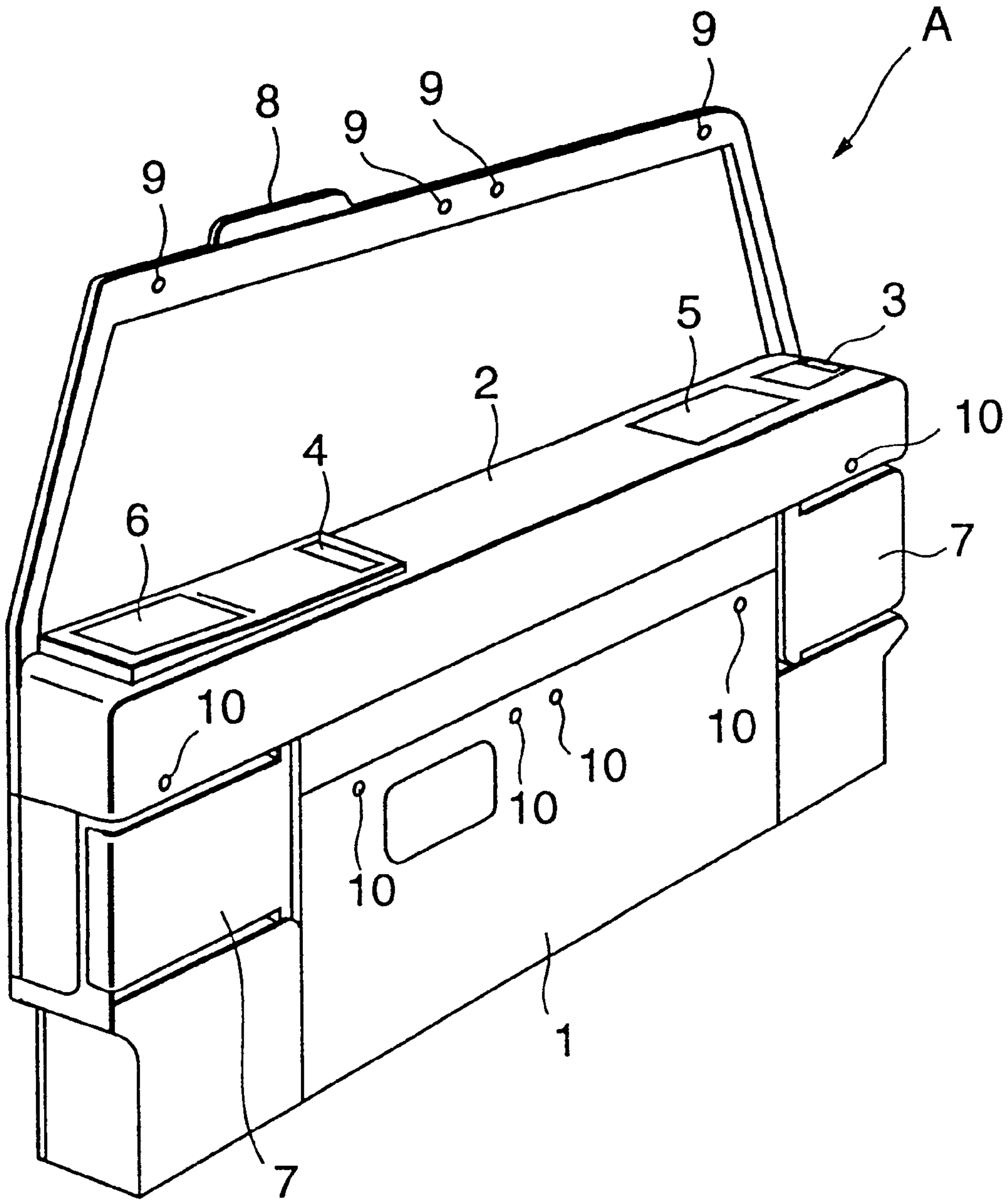
FIG. 1 is a perspective view showing the outer structure of an automatic gate apparatus involved in a gate system of the present invention.

FIG. 1 is a diagram schematically showing the exterior view of an automatic gate apparatus A involved in this embodiment.

Normally, two units of the automatic gate apparatus A are made as one set and several units are arrange side by side at the entrance to a station and a passage is formed between them for entrance or exit of users.

On the top of a main body 1 of the automatic gate apparatus A, a top cover 2 is provided. At one end of the main body 1, there is provided an insert port 3 of magnetic type railroad tickets (magnetic tickets) on which data is magnetically recorded and a number of magnetic tickets can be accepted collectively or one by one. At the other end of the main body 1, there is provided a take-out port (a return port) 4 to eject the magnetic tickets inserted at the time of entering or exiting.

Near the insert port 3, a shutter (not shown) is provided to prevent the insertion of tickets and the erroneous insertion of a wireless card (wireless device) as a wireless recording medium can be prevented by the action of this shutter.

On the top cover 2, an antenna 5 is provided for making the wireless communication with a wireless card carried by a user.

On the top cover 2 near the take-out port 4, a guidance display 6 is provided to provide a guidance for passage or for no passage to users. On the side at the passage of the main body 1, doors 7 are provided to block the passage of user when the passage is not approved. Further, on the main body 1 and a pole, an abnormal/children indicator 8 that is turned on when any abnormality occurs and when a child ticket is inserted, and human sensors 9 and 10 are provided for detecting human in the passage.

Figure 2:
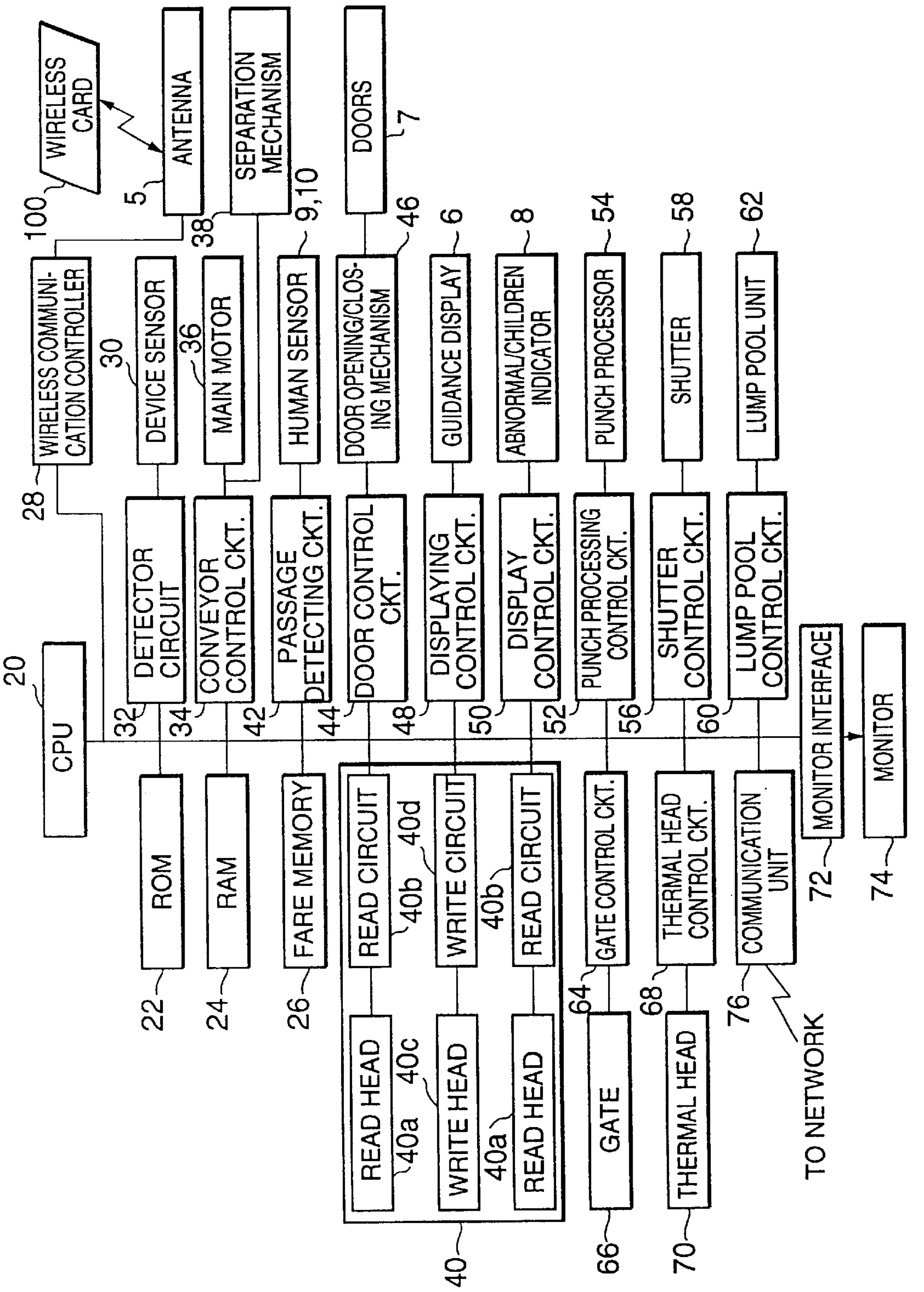
FIG. 2 is a block diagram showing the structure of an internal control system of the automatic gate apparatus shown in FIG. 1.

FIG. 2 is a block diagram schematically showing the control system of the automatic gate apparatus A.

The automatic gate apparatus A has a CPU 20 that generally controls the entire system. A ROM 22, RAM 24, fare memory 26, wireless communication controller 28, device sensor 28, detector circuit 32, conveyor control circuit 34, main motor 36, separation mechanism 38, magnetic ticket processor 40, passage detecting circuit 42, door control circuit 44, door opening/closing mechanism 46, displaying control circuit 48, display control circuit 50, punch processing control circuit 52, punch processor 54, shutter control circuit 56, shutter 58, lump pool control circuit 60, lump pool unit 62, gate control circuit 64, gate 66, thermal head control circuit 68, thermal head 70, monitor interface 72, monitor 74, and communication unit 76 are connected to the CPU 20.

The ROM 22 stores a control program of the CPU 20. The RAM 24 stores data read from the ROM 22 and tickets, plural display patterns that are prepared pre-selectable, and data as a buffer of the control program. The fare memory 26 stores data on fare from an entered station from where the use of a ticket started to a station where this automatic gate apparatus A is installed.

The device sensor 30 is installed on various units on the conveying path (not shown) provided from the insert port to the take-out port in the apparatus. The detector circuit 32 detects the insertion of a magnetic ticket sensed by the device sensor 30. The conveyor control circuit 34 drives the main motor 36 based on the detection by the detector circuit 32 and controls the conveyance of a magnetic ticket inserted through the inset port 3 on the conveying path (not shown) in the apparatus. The separation mechanism 38, when tickets conveyed are in plural numbers, separates them and conveys one by one according to the result of detection by the device sensor 3 and the detector circuit.

The magnetic ticket processor 40 reads and writes recorded content of a magnetic ticket by a read circuit 40*b* which controls a read head 40*a* and a writing circuit 40*d* which controls a write head 40*c*. The passage detecting circuit 42 detects the passing state of user in the passage according to the detected results of the human sensors. The door control circuit 44 drives the doors 7 by the door opening/closing mechanism 46 according to the judgement of approval/disapproval of passage of user by the CPU 20.

The display control circuit 48 controls the display screen of the guidance display 6. The communication unit 76 communicates with plural devices of plural automatic gate apparatus that are connected in a network by the communication lines.

The monitor interface 72 is connected to the monitor 74 by which an attendant monitors plural automatic gate apparatus A collectively.

Figure 3:
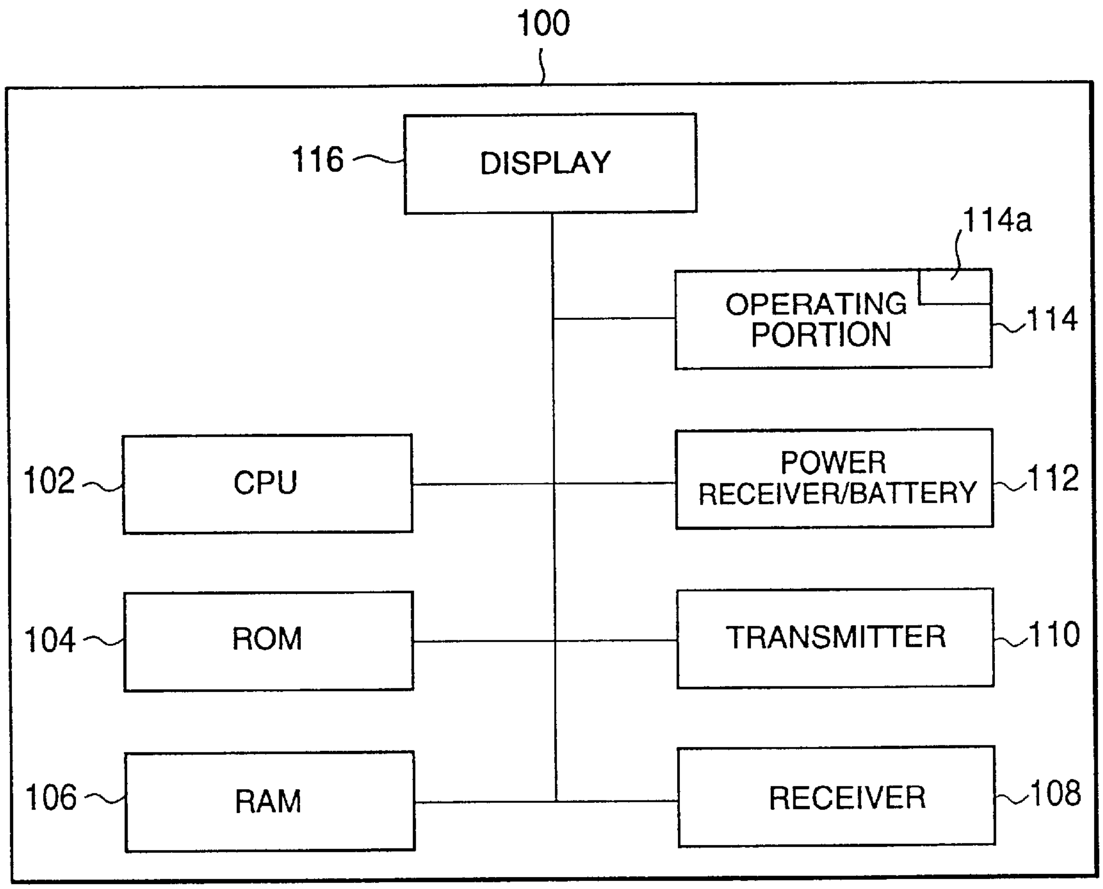
FIG. 3 is a block diagram showing the structure of an internal wireless card control system of the present invention.

FIG. 3 is a block diagram showing the internal structure of a wireless card 100. That is, the wireless card 100 is equipped with a CPU 102, ROM 104, RAM 106, receiver 108, transmitter 110, power receiver/battery 112, operating portion 114 and display 116.

The CPU 102 controls the operation of various portions of the wireless card (device) 100. The ROM 104 stores various control programs, etc. The RAM 106 stores communication data with the automatic gate apparatus and data showing the content of use, etc. Further, an ID code that is given to each wireless card and gate data are recorded on either the ROM 104 or RAM 106. For instance, when a wireless card is equipped with both functions of a commutation ticket and an SF card, commutation ticket using data (purchase data such as a commuting section, a commuting period, date purchased, etc.) as the regular entraining data and SF card using data (purchase/using data such as purchase amount, used section, expiration date, remainder of money, etc.) as money data are recorded as the gate data.

The receiver 108 receives wireless data when transmitted from the automatic gate apparatus to the wireless card 100 and supplies the data to the CPU 102, RAM 106, etc. Further, the transmitter 110 transmits data processed in the CPU 102, etc. to the automatic gate apparatus A. The power receiver/battery 112 functions as a power source to operate the portions of the wireless card 100. The power receiver/battery 112 can receive, for instance, electromagnetic wave transmitted from the automatic gate apparatus A, converts it into electric power and supplies to the portions or a battery itself may be built in the power receiver/battery 112.

The operating portion 114 operates to control the wireless communication with the automatic gate apparatus A. The operating portion 114 performs such operations, for instance, ON/OFF of the power source, setting of right or wrong of the communication, stop of either one of functions when a wireless card has commuting ticket data and SF card data (data of only one of the functions enables the wireless communication).

The display 116 displays data stored in the ROM 104 and RAM 106, data selected by the operating portion 114 or the result of processing by the communication with the automatic gate apparatus. The display 116 is driven by the power supplied from the power receiver/battery 112 and when a battery is built in it, displays the display content using the power supplied from its battery. Further, when the power receiver/battery 112 supplies electric power by converting electromagnetic wave transmitted from a processor of the automatic gate apparatus, an indicator that has a nature to hold the content once displayed may be used for the display 116.

It is also possible to display data recorded on the RAM 106 of the wireless card 100 using a dedicated reading terminal. In this case, as a dedicated reading terminal, there are available various types ranging from a reading terminal that is installed at a station to a small type potable device that is easily usable by user like an easy IC card reader. When using such a reading terminal, there are various methods available to display such data as recorded content/processed content on a display provided to a reading terminal or display them on the display 116 of the wireless card 100 that is driven by a reading terminal.

Next, as an example of the wireless card 100, the wireless card 100 which has the functions as a commutation ticket and an SF card will be explained referring to the exterior views shown in FIG. 4, FIG. 5 and FIG. 6.

The display 116 of the wireless card 100 changes the content of display conforming to the using state of the wireless card 100 that has the function of an SF card and that of a commutation ticket. In the wireless communication with the automatic gate apparatus A when entering into the station yard or exiting therefrom, this display content is changed conforming to the using state based on the content of communication. That is, what is displayed on the display 116 should be confirmed that the wireless card 100 was used as a commutation ticket when it was used at a station in the effective section of the commutation ticket and as a stored fare card (SF card) when it was used outside the effective section of the commutation ticket.

Figure 4:
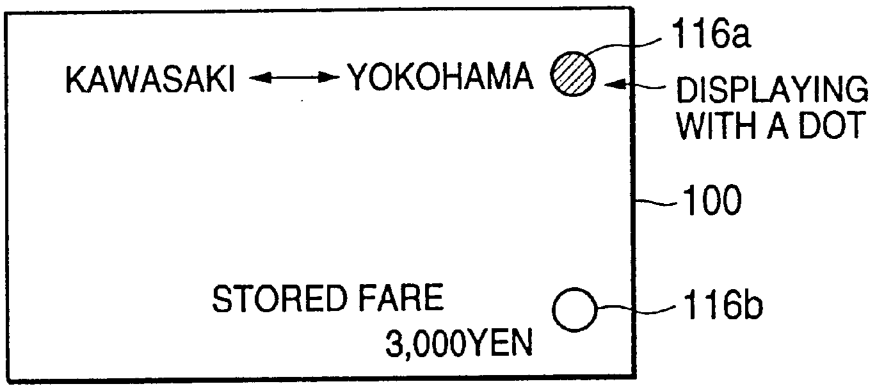
FIG. 4 is a front view showing an example of indication on a wireless card display shown in FIG. 3.

In an example of the wireless card 100 shown in FIG. 4, commutation ticket data (a using section) and SF card data (an SF card purchased at ¥3,000) are pre-printed. Then, dot type indicators 116*a* and 116*b* are provided at the right side of the data showing the commutation ticket section and SF card as the display 116. In the communication with the automatic gate apparatus A when entering into a station yard or exiting therefrom, the indicator 116*a* provided at the right side of the commutation ticket section is turned ON for the use of the wireless card 100 in the section of the commutation ticket and the indicator 116*b* provided at the right side of the data showing the SF card is turned ON for the use as the SF card at the outside of the commutation ticket section.

Figure 5:
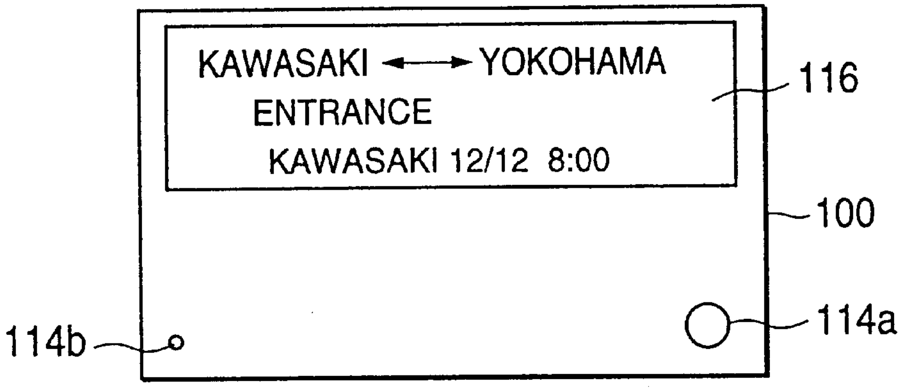
FIG. 5 is a diagram showing another example of indication on the wireless card display shown in FIG. 3.
Figure 6:
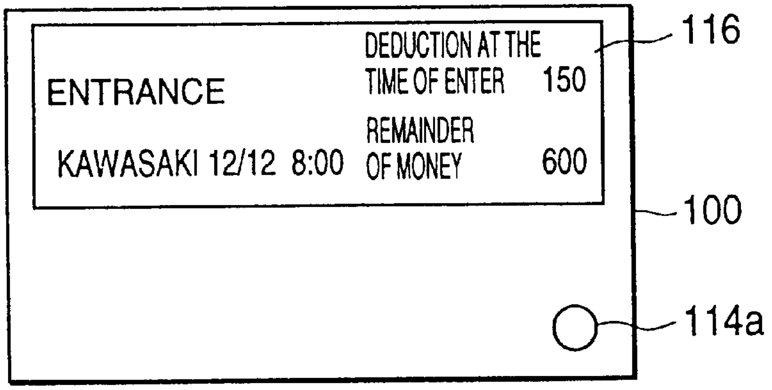
FIG. 6 is a diagram further showing another example of indication on the wireless card display shown in FIG. 3.

Further, the display 116 of the wireless card 100 may be an indicator comprising LED, ECD and the like that are capable of indicating characters as shown in FIG. 5 and FIG. 6. In this case, when the wireless card 100 is used in the effective section shown on the commutation ticket, the using section, an entering station and date of use of the commutation ticket are displayed through the communication with the automatic gate apparatus A as shown in FIG. 5.

When the wireless card 100 is used at a station outside the effective section on the commutation ticket, an entering station name (or an exiting station name), the date of use, a deduction amount at the time of enter (a deduction amount at the time of exit), a remainder of money, etc. are indicated as the use of the SF card function.

Further, the period for displaying the content of use on the display 116 of the wireless card 100 can be a specified hour after user passed the automatic gate apparatus A or a period of time after passing through the automatic gate apparatus A to a time of exit.

Further, as another example, a switch 114*a* may be provided to the wireless card 100 so as to display the using history of the wireless card 100 when depressing this switch 114*a*.

In this case, the using history is data that is not much necessary in the ordinary use and therefore, the switch 114*a* is provided to direct the display to an operating portion 114 on the wireless card 100 so as to display the using history on the display 116 when this switch 114*a* is depressed. For the using history to be displayed on the display 116, for instance, the using history in the past is displayed in order according to the depression of the switch 114*a*. Further, according to the depressing pattern of the switch 114*a*, the using history of a commutation ticket only, or the using history of SF card only or all using histories of a commutation ticket and SF card in mix may be displayed. Further, it is also possible to preset so as to select the using history of a commutation ticket only or the using history of SF card only or the using history of all of them. Thus, user is able to easily check the using histories of the wireless card.

In addition to the using history, it is also possible to enable it to display the history of illegal use of the wireless card for checking by a station attendant. As an example of an illegal use of a commutation ticket, there is such a case wherein user forces his way through the gate apparatus although the passage is not approved due to the outside of the effective section on a commutation ticket or short of the remainder of money on the SF card. In this forced passage, data showing the illegal use is written on the wireless card 100 by the automatic gate apparatus so that it becomes possible to check the content of illegal use according to a method that can be directed only by a station attendant.

In this case, a means by which a station attendant only is able to direct to display the content of illegal use (an illegal use history) is provided so that user is not able to display it. For instance, separate from the switch 114*a* for displaying the use history, the switch 114*b* that is operable by a station attendant only not by user is provided and only when this switch 114*b* is operated, the content of illegal use is displayed. Further, the content of illegal use may be displayed according to a depressing pattern of the independent switch 114*a* that is known by a station attendant only and not known to user. Thus, user is not allowed to see the content of illegal use and a station attendant only is able to check the illegal use history.

Further, when it is necessary to provide special data to users from a station such as train times, last train time guide, advertisements, using guide from a station, cautions in using trains, after processing by the automatic gate apparatus A, display data is transmitted to wireless cards. Upon receipt of this display data, the wireless card 100 may display a guide on the display 116 according to the display data.

In this case, for instance, when the wireless card 100 is used in such an apparatus as the automatic gate apparatus A which processes the wireless card 100, after completing the processing, data provided from a station is transmitted to the wireless card as display data. On the other hand, it may be so set that the transmitted display data only may be displayed on the wireless card 100 or at a specified time after displaying the content of process as mentioned above, the transmitted display data may be displayed or the display data may be displayed only when the switch 114*a* is depressed.

Thus, data that is desired to provide to user from a station can be provided easily and certainly.

Further, as a method to display such data transmitted to the wireless card 100 for display, pre-store the display contents in the wireless card as fixed patterns and upon receipt of specific codes corresponding to these fixed patterns, display them.

Thus, volume of data transmitted as display data can be reduced and the processing speed can be increased.

Further, any content is transmitted from the automatic gate apparatus A or other apparatus and text data or bit map data may be transmitted so that the wireless card 100 displays the guide on the display 116 according to the text data or bit map data transmitted as display data.

Thus, any guide can be transmitted as display data and displayed on the wireless card and various data can be provided to user as guide.

Next, the entrance processing at the time of entering will be explained.

First, the operation of the automatic gate apparatus A when user enters into a station yard will be explained referring to the flowchart shown in FIG. 7.

The CPU 20 of the automatic gate apparatus A first transmits a starting signal via the antenna 5 by the wireless communication controller 28 (Step 1). Then, the CPU 20 judges whether an ID code is received from the wireless card 100 by the wireless communication controller 28 (Step 2). When judged that an ID card is received, the CPU 20 transmits a data transmission request to the wireless card 100 via the antenna 5 by the wireless communication controller 28 (Step 3).

When the commutation ticket and money data are not received from the wireless card 100 within a specified time after transmitted the data transmission request (Steps 4 and 5), the CPU 20 judges that the time is over and returns the process to Step 1.

Further, when the communication ticket and money data are received from the wireless card 100 against the data transmission request (Step 4), the CPU 20 judges whether the entrance is within the effective section on the commutation ticket according to the received commutation ticket data (Step 6). When judged that the entrance is within the effective section on the commutation ticket, the CPU 20 judges that the commutation ticket is used and generates entrance data including data showing the taking of train using a commutation ticket, an entered station, date of entrance, etc. (Step 7). The CPU 20 transmits this generated entrance data to the wireless card 100 via the antenna 5 by the wireless communication controller 28 (Step 8).

Further, when judged that the use of the wireless card is not in the effective section on the commutation ticket in Step 6, the CPU 20 judges that it is the use of SF card and judges a specified using amount (a first fare). Then, the CPU 20 judges whether the remainder of money on the wireless card is larger than the using amount (Step 9). When judging that the remainder of money is larger than the using amount, the CPU 20 calculates an accurate amount by deducting the used amount from the remainder of money (Step 10). The CPU 20 generates the entrance data including the remainder of money deducting the used amount or the deducted amount (Step 11). Then, the CPU 20 transmits the generated entrance data to the wireless card via the antenna 5 by the wireless communication controller 28 (Step 12).

After transmitting entrance data showing the process content of the entrance/exit judgement in Steps 8 and 12, the CPU 20 records an ID code of a wireless card 100, the process status (an entered station, date, a deducted amount, the use as a commutation ticket or a money card) and records the passage approval as a result of the process in a memory such as the RAM 24 or a data base (not shown) as an external device(Step 13).

Then, upon receive of the end data from the wireless card (Step 14), the doors 7 are opened and the passage of user is approved (Step 15). When the end data could not be received within a specified time (Step 16), the doors 7 are closed and the passage of user is blocked (Step 17).

Further, when judging that the remainder of money is less than the used amount, the CPU 20 judges the disapproval of entrance of user and the passage of user is blocked by closing the doors 7 (Step 18).

In this case, the CPU 20 displays the guidance showing the disapproval of the passage due to the short of an amount of money on the guidance display 6 by the displaying control circuit 48 (Step 19). Then, the CPU 20 transmits the data showing the disapproval of passage to the wireless card 100 by the wireless communication controller 28 (Step 20).

Then, after transmitting the data showing the process content of the entrance/exit judgement to the wireless card 100, the CPU 20 records the ID code of the wireless card 100, the process status (an entered station, date, a deducted amount, use of the wireless card 100 as a commutation ticket/SF card) and the disapproval of passage as a result of the process on the RAM 24 or a data base (not shown) (Step 21) and terminates the process.

Next, the process on the wireless card 100 at the time of entrance corresponding to the entrance process by the automatic gate apparatus A will be explained referring to the flowchart shown in FIG. 8.

That is, upon receipt of the starting signal from the automatic gate apparatus A (Step 31), the CPU 102 of the wireless card 100 transmits the ID code of the wireless card 100 to the automatic gate apparatus A by the transmitter 110 (Step 32). Corresponding to this, when a data transmission request is received from the automatic gate apparatus A within a specified time (Step 33), the CPU 102 reads the using data of the wireless card 100 as a regular taking a train and the amount of money data as the SF card (Step 34) and transmits them to the automatic gate apparatus A (Step 35). At this time, if the data transmission request couldn't be received from the automatic gate apparatus A within a specified time (Step 33), the process is terminated.

Hereafter, when the passage is judged by the automatic gate apparatus A for approval/disapproval and the data showing the process contents of entrance data and passage disapproving data are received (Step 37), the CPU 102 writes the received data into a memory such as the RAM 106, etc. (Step 40).

At this time, if the data couldn't be received within a specified time (Steps 37 and 38), the data showing the transmission status that the data was not received within a specified time is stored in a memory such as the RAM 106, etc. (Step 39).

The CPU 102, after writing the received data in the RAM 106 in Step 40, transmits the writing end data to the automatic gate apparatus (Step 41).

The CPU 102 judges whether the process content is the use of a commutation ticket or the use of SF card (Step 42). When the process content is the use of a commutation ticket, the CPU 102 displays the data showing the use of a commutation ticket or the such data as the using section of a commutation ticket/the using data, etc. on the display 116 (Step 43). Further, when the use of SF card was judged, the CPU 102 displays the data showing the use of SF card or the such using contents as the using section, using date, using amount and remainder of money of the SF card on the display 116 (Step 44).

After the lapse of a definite time from this display (Step 45), the CPU 102 erases the display contents on the display 116 (Step 46). Further, when the display 116 displays data from when entered to when exited, the display may be kept in that state until the exit process is executed.

Further, when user operates to direct the re-display on the operating portion 114 after the display content was erased (Step 47), the CPU 102 displays the using content or the using history.

Next, the exit process when exiting from a station will be explained.

Figure 9:
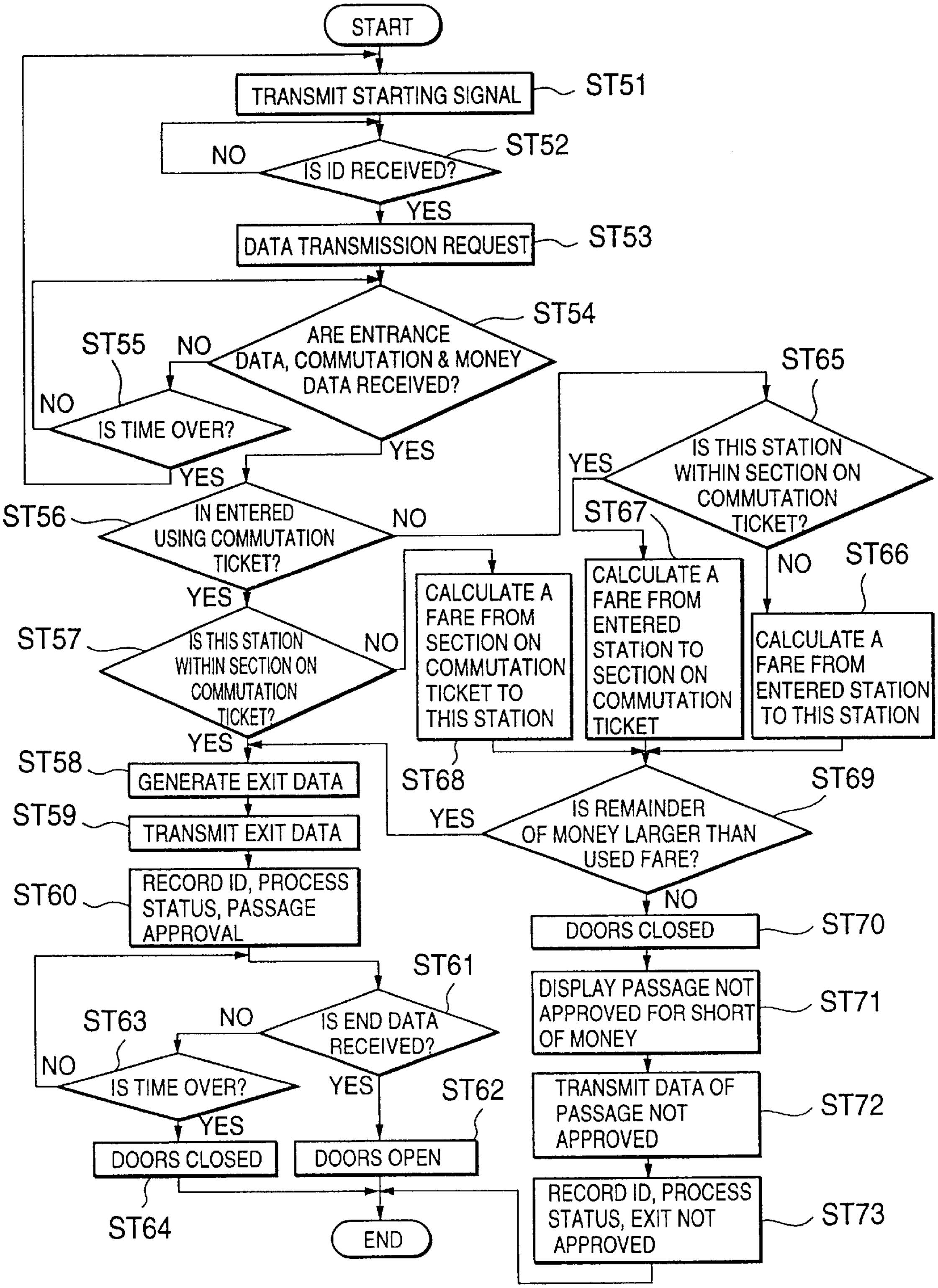
FIG. 9 is a flowchart for explaining the exit process in the automatic gate apparatus of the present invention.

First, the operation of the automatic gate apparatus when a user exits from a station yard will be explained referring to the flowchart shown in FIG. 9.

First, the CPU 20 of the automatic gate apparatus A transmits a starting signal via the antenna 5 by the wireless communication controller 28 (Step 51). Then, the CPU 20 judges whether an ID code is received from a wireless card 100 by the wireless communication controller 28 (Step 52). When it was judged that an ID card is received, the CPU 20 transmits a data transmission request to the wireless card 100 via the antenna 5 by the wireless communication controller 28 (Step 53).

When data on a commutation ticket, an amount of money and entrance data could not be received from he wireless card 100 within a specified time after the data transmission request was transmitted (Steps 54 and 55), the CPU 20 judges that the time is over and returns the process to Step 1.

Further, when such data of a commutation ticket, an amount of money and entrance data from the wireless card 100 are received in response to the data transmission request transmitted (Step 54), the CPU 20 judges whether a user entered into a station in the effective section of a commutation ticket based on the received entrance data (Step 56). When judging that the user entered in the station in the effective section of the commutation ticket, the CPU 20 further judges whether this station (an exit station) is within the effective section of the commutation ticket based on the commutation ticket data received from the wireless card 100 (Step 57).

When an exit station is within the effective section of the commutation ticket, the CPU 20 judges that a user took a train in the effective section of a commutation ticket and generates exit data including the data showing the taking a train using a commutation ticket, an exit station and date (Step 58). The CPU 20 transmits this generated exit data to the wireless card 100 via the antenna 5 by the wireless communication controller 28 (Step 59). Then, the CPU 20 records the process contents including ID code of a wireless card 100 that becomes an object of the exit process, and its processing state (an exit station, date, use of the wireless card either as a commutation ticket or a money card, approval of exit) in a memory such as the RAM 24 or a data base of an external device (not shown) (Step 60).

Then, receiving the end data showing the completion of the process from the wireless card 100 (Step 61), the CPU 20 opens the doors 7 and allows a used to exit (Step 62). At this time, when the end data showing the completion of the process is not received from the wireless card 100 within a specified time (Step 63), the CPU 20 closes the doors 7 and disapproves a user to exit (Step 64).

Further, when judging that a user did not enter into a station yard within the effective section of a commutation ticket in Step 56, the CPU 20 further judges whether this station (an exit station) is within the effective section of the commutation ticket according to the commutation ticket data received from the wireless card 100 (Step 65).

When it is judged that this station (an exit station) is within the effective section of the commutation ticket as a result of this judgement, the CPU 20 judges that a user takes a train using an SF card and calculates a fare from an entered station to this station (Step 66). That is, when a user entered into a station using an SF card and exits an exit station using the SF card because the exit station is outside the effective station of a commutation ticket, it is judged that the SF card is used from the entered station to the exit station, and a fare is calculated accordingly.

Further, when it is judged that this station is outside the effective section of a commutation ticket in Step 65, the CPU 20 judges that a user took a train from the entered station to the effective section of the commutation ticket and calculates a fare from the entered station to the effective section of the commutation ticket (Step 67). That is, when a user enters into a station using an SF card and exits from the station using a commutation ticket because the exit station is within the effective section of the commutation ticket, it is judged that the SF card is used from the entered station to the effective section of the commutation ticket and a fare for that section is calculated.

Further, when it is judged that this station is outside the effective section of a commutation ticket in Step 57, the CPU 20 judges that a user takes a train using an SF card from the effective section of a commutation ticket to this station and calculates a fare from the effective section of a commutation ticket to this station (Step 68). That is, when a user enters in a station using a commutation ticket and exit an exit station using an SF card because the exit station is outside of the effective section of a commutation ticket, it is judged that from the effective section of a commutation ticket to the exit station is an SF card using section and a fare for that section is calculated.

When a fare for the using section of an SF card is calculated in Steps 66, 67 and 68, it is judged whether the remainder of money is less than a using fare according to the data of an amount of money received from the wireless card (Step 69).

When judging that a using fare is larger than the remainder of money, the CPU 20 closes the doors 7 to block the passage of a user and displays the guidance on the guidance display that the exit is disapproved due to the shortage of an amount of money by the displaying control circuit 48 (Step 71).

Then, the CPU 20 prepares data to notify the disapproval of exit and transmits it to the wireless card 100 by the wireless communication controller 28 (Step 72) and records the ID code of the wireless card 100 and the process contents including the process status in the RAM 24 or a data base (not shown) (Step 73).

Further, when it is judged that the using amount is less than the remainder of money in Step 69, the CPU 20 proceeds to Step 58 and calculates an adjusted amount by deducting the using amount from the remainder of money, generates exit data including the deducted amount and executes the exit process.

Figure 10:
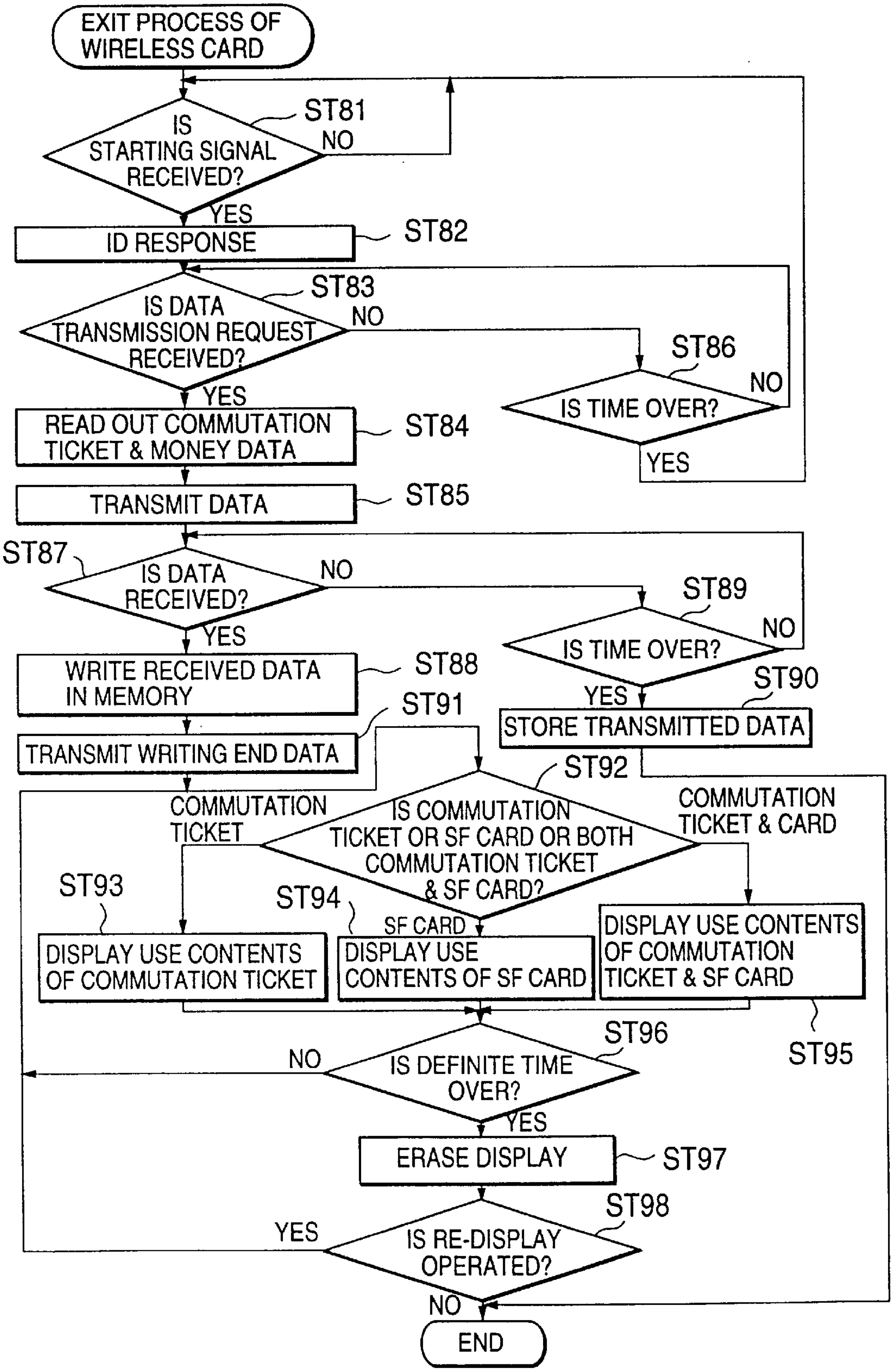
FIG. 10 is a flowchart for explaining the action of a wireless card corresponding to the exit process in the automatic gate apparatus of the present invention.

Next, the process on the wireless card 100 at the time of exit corresponding to the exit process in the automatic gate apparatus A will be explained referring to the flowchart shown in FIG. 10.

When a starting signal is received from the automatic gate apparatus (Step 81), the CPU 102 of a wireless card 100 transmits an ID code of the wireless card 100 to the automatic gate apparatus A by a transmitter 110 (Step 82). Then, upon receipt of a data transmission request from the automatic gate apparatus A within a specified time (Step 83), the CPU 102 reads out the commutation ticket data and the money data of the wireless card 100 (Step 84) and transmits these data to the automatic gate apparatus A (Step 85). At this time, if the data transmission request could not be received from the automatic gate apparatus A within a specified time (Step 86), the process is terminated.

Thereafter, the approval or disapproval of exit is judged by the automatic gate apparatus A and when an exit data or data showing the disapproval of exit is received from the automatic gate apparatus A, the CPU 102 writes the received data into a memory such as the RAM 106, etc.(Step 88). At this time, if the data could not be received within a specified time (Step 89), the CPU 102 stores the data showing the transmission status of a message showing that no data could be received within a specified time in a memory such as the RAM 106, etc. (Step 90).

After writing the data received in Step 89, the CPU 102 transmits the end data showing the completion of writing to the automatic gate apparatus A (Step 91).

Further, the CPU 102 judges whether the process content shows the use of a commutation ticket, or SF card or both of them (Step 92). When the process content shows the use of a commutation ticket, the data showing the use of a commutation ticket or the using content of the use section or data of the use of a commutation ticket is displayed on the display 116 (Step 93).

Further, when it is judged that an SF card is used, the data showing the use of SF card or such using contents as the using section, using date, a using amount, a remainder of money of the SF card are displayed on the display 116 (Step 94).

Further, when it is judged that both of a commutation ticket and an SF card are used, the data showing the use of a commutation ticket and an SF card or such using contents as the using section of a commutation ticket and SF card, using date, a using amount, a remainder of money are displayed on the display 116 (Step 95).

In this time, for instance, when the display 116 comprises the indicator 116*a* showing the use of a commutation ticket and the indicator 116*b* showing the use of SF card as shown in FIG. 4, both indicators are turned ON. Further, when the display displays characteristic data as shown in FIG. 5 and FIG. 6, the using section of a commutation ticket, the using section of an SF card, a using amount, a remainder of money and the data of use are displayed on the display 116.

After the lapse of a definite time from this display (Step 96), the CPU 102 erases the display content on the display 116 (Step 97). Further, to display the status from the entrance to the exit on the display 116, the contents displayed in Step 95 may be erased.

Further, when a user operates the operating portion 114 to direct the re-display after erasing the display contents (Step 98), the CPU 102 displays the using contents, the using history and the like.

As described above, when the gate process is performed, the using contents, that is, the process contents are displayed on the display on the wireless card. Thus, when a person carrying the wireless card uses the automatic gate apparatus, that person is enabled to recognize the used contents easily.

Further, when the gate process is performed using a wireless card that has multiple functions, a used function is displayed. Thus, when a wireless card having multiple functions is used, a user is able to know what function was used easily.

Further, when the using contents are displayed, the display is erased after a specified time or when exiting a station. Thus, a wireless card can be used efficiently without consuming a built-in power source wastefully.

Figure 7:
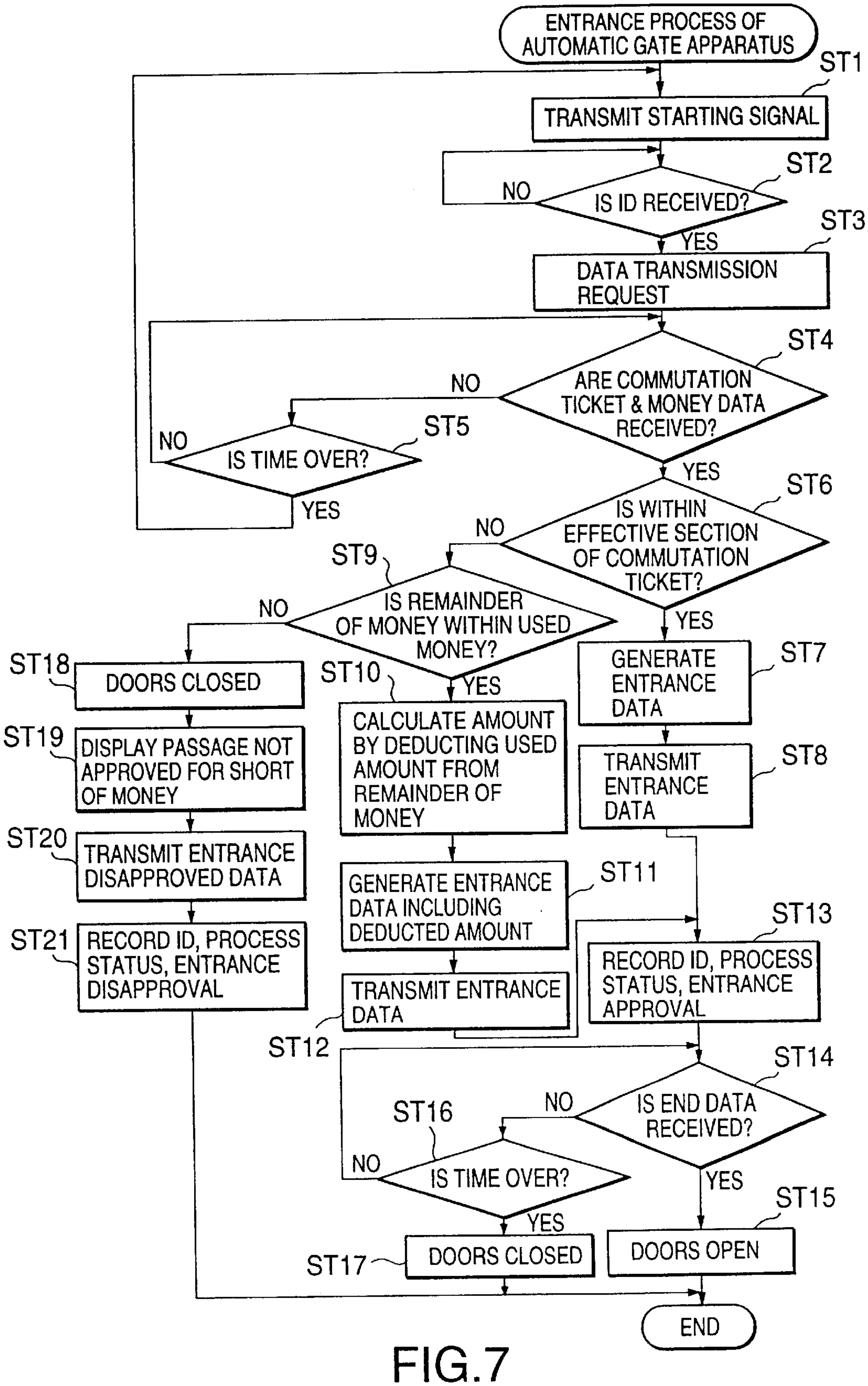
FIG. 7 is a flowchart for explaining an entrance process in the automatic gate apparatus of the present invention.
Figure 8:
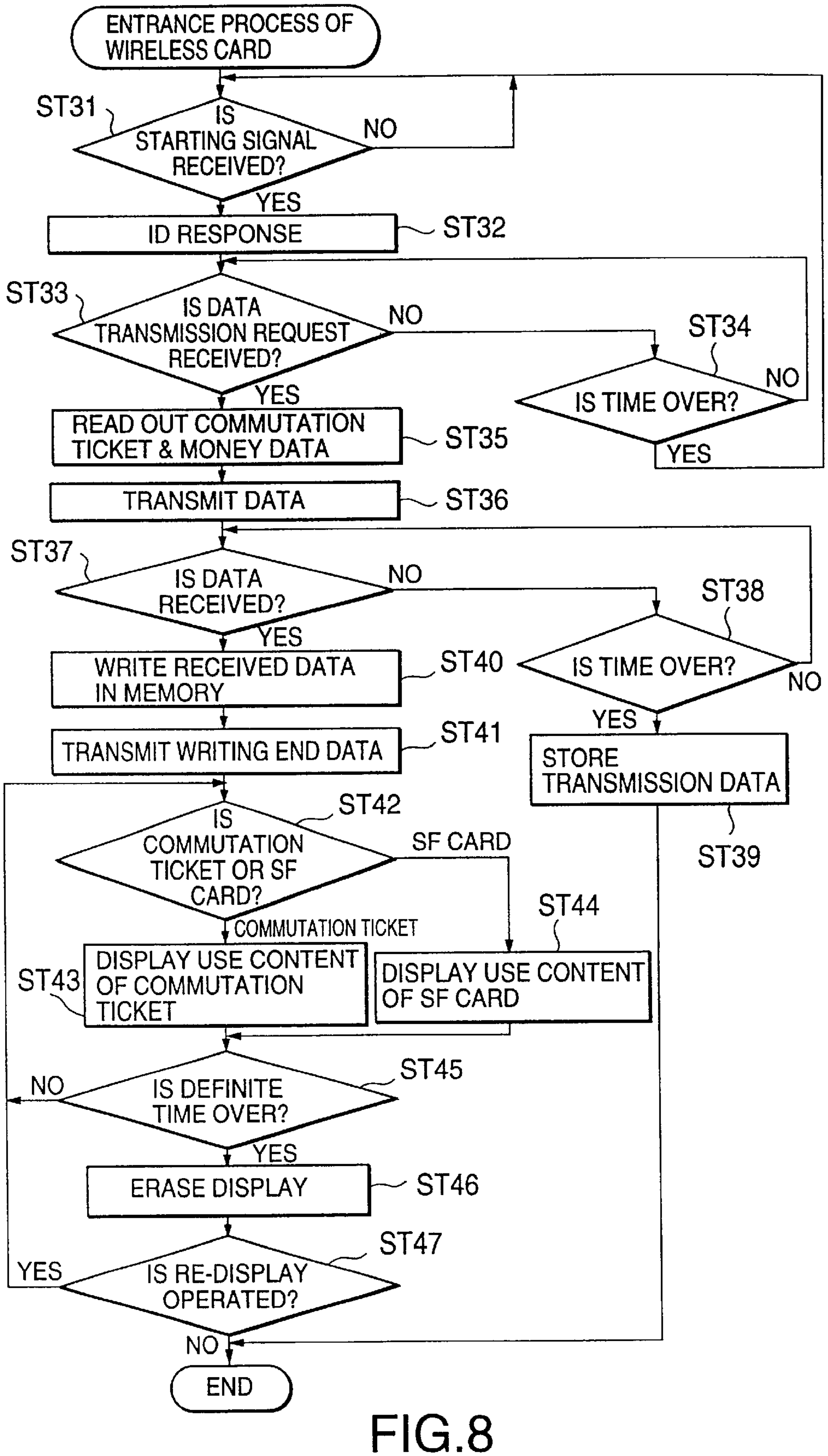
FIG. 8 is a flowchart for explaining the action of a wireless card corresponding to the entrance process in the automatic gate apparatus of the present invention.

In the entrance process shown in FIG. 7 and FIG. 8, the entrance process by one automatic gate apparatus was explained. Now, the entrance process in another case will be explained. For instance, in the case where multiple automatic gate apparatus are installed side by side at the entrance to a station and a wireless card 100 carried by a user is processed for entrance through the wireless communication with a first automatic gate apparatus but the user does not pass through the first automatic gate apparatus A and passes another automatic gate apparatus (a second automatic gate apparatus). The entrance process in this case will be explained.

For instance, at the entrance to a station where multiple passages are formed with multiple automatic gate apparatus and it is assumed that a user comes to close to a first automatic gate apparatus of these multiple gate apparatus. In this case, if a wireless card 100 carried by a user is put in the communication range of the first automatic gate apparatus, the wireless communication will start and the entrance process is executed.

Thereafter, however, the user does not pass through the passage formed with the first automatic gate apparatus but tries to pass through the passage formed with a second automatic gate apparatus adjacent to the first automatic gate apparatus. In this case, the entrance data is recorded on a wireless card 100 that is received by the second automatic gate apparatus through the wireless communication.

In this case, the passage through the second automatic gate apparatus by the wireless card with the entrance data recorded is so far denied. However, actually, the user does not enter into a station through the passage formed by the first automatic gate apparatus and therefore, it cannot be said that the user commits an illegal deed.

Therefore, a user carrying a wireless card 100 with the entrance status recorded in the first automatic gate apparatus as described above is approved to enter into a station through the first automatic gate apparatus and also another gate apparatus installed near it only for a specified time after the execution of the entrance process in the first automatic gate apparatus. If the entrance is approved by the second automatic gate apparatus without limitation after the process by the first automatic gate apparatus, there is the possibility for the illegal deed that a user who once entered into a station gives a wireless card to another person and this person enters into a station illegally. Because of this, for a wireless card once processed for entrance, a user of this wireless card is approved to enter through the automatic gate apparatus itself that processed the wireless card for entrance and another automatic gate apparatus installed near it only for the specified time.

Figure 11:
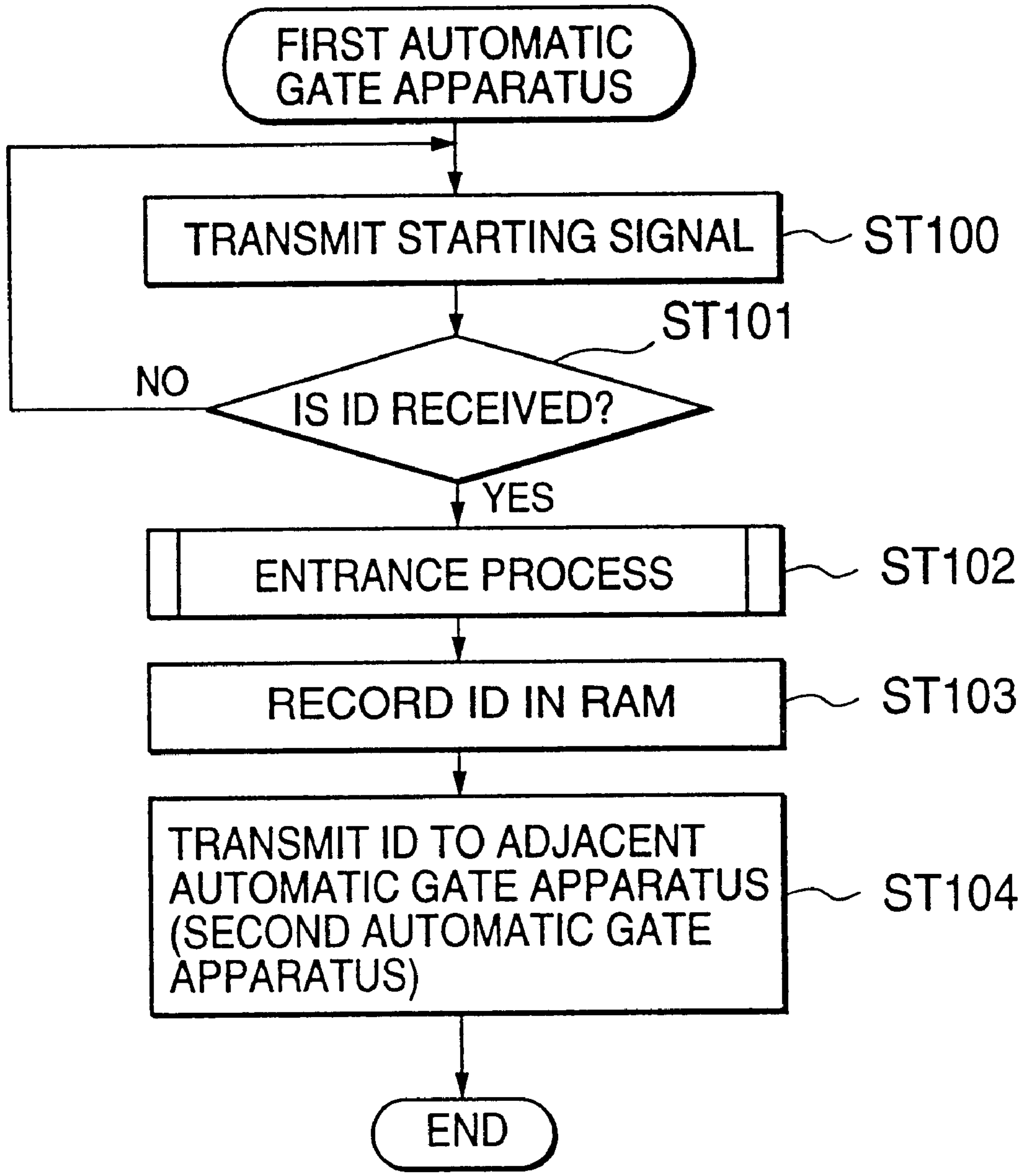
FIG. 11 is a flowchart for explaining the entrance process of a first automatic gate apparatus in the present invention.

First, assuming that at the entrance to a platform where multiple automatic gate apparatus are installed, the wireless communication is made between a wireless card 100 carried by a user and a first automatic gate apparatus and that user tries to enter from another automatic gate apparatus (a second automatic gate apparatus) without entering through the first automatic gate apparatus, the process in this case will be explained referring to the flowcharts shown in FIG. 11 and FIG. 12.

When a user comes close to the entrance to a platform where multiple passages are formed with multiple automatic gate apparatus and a wireless card 100 carried by the user comes in the communication range of one automatic gate apparatus (a first automatic gate apparatus) of them. At this time, the first automatic gate apparatus is transmitting a starting signal (Step 100) and waiting the receipt of an ID code. When the ID code is received from the wireless card 100 (Step 101), the first automatic gate apparatus starts the wireless communication with the wireless card 100 and executes the entrance process (Step 102).

That is, when receiving an ID code assigned to the wireless card 100 with the wireless communication with the wireless card 100 in response to the transmitted starting signal (Steps 100, 101), the CPU 20 of the first automatic gate apparatus records the ID code in a memory such as the RAM 24 of the first automatic gate apparatus (Step 103). The CPU 20 transmits the ID code together with this record to another automatic gate apparatus (the second automatic gate apparatus) adjacent to the first automatic gate apparatus via the network by the communication unit 76 (Step 104).

Further, in this case, when the entrance is approved to the wireless card 100 by the entrance process of the first automatic gate apparatus, the entrance data showing the entering state is recorded on the wireless card 100.

Figure 12:
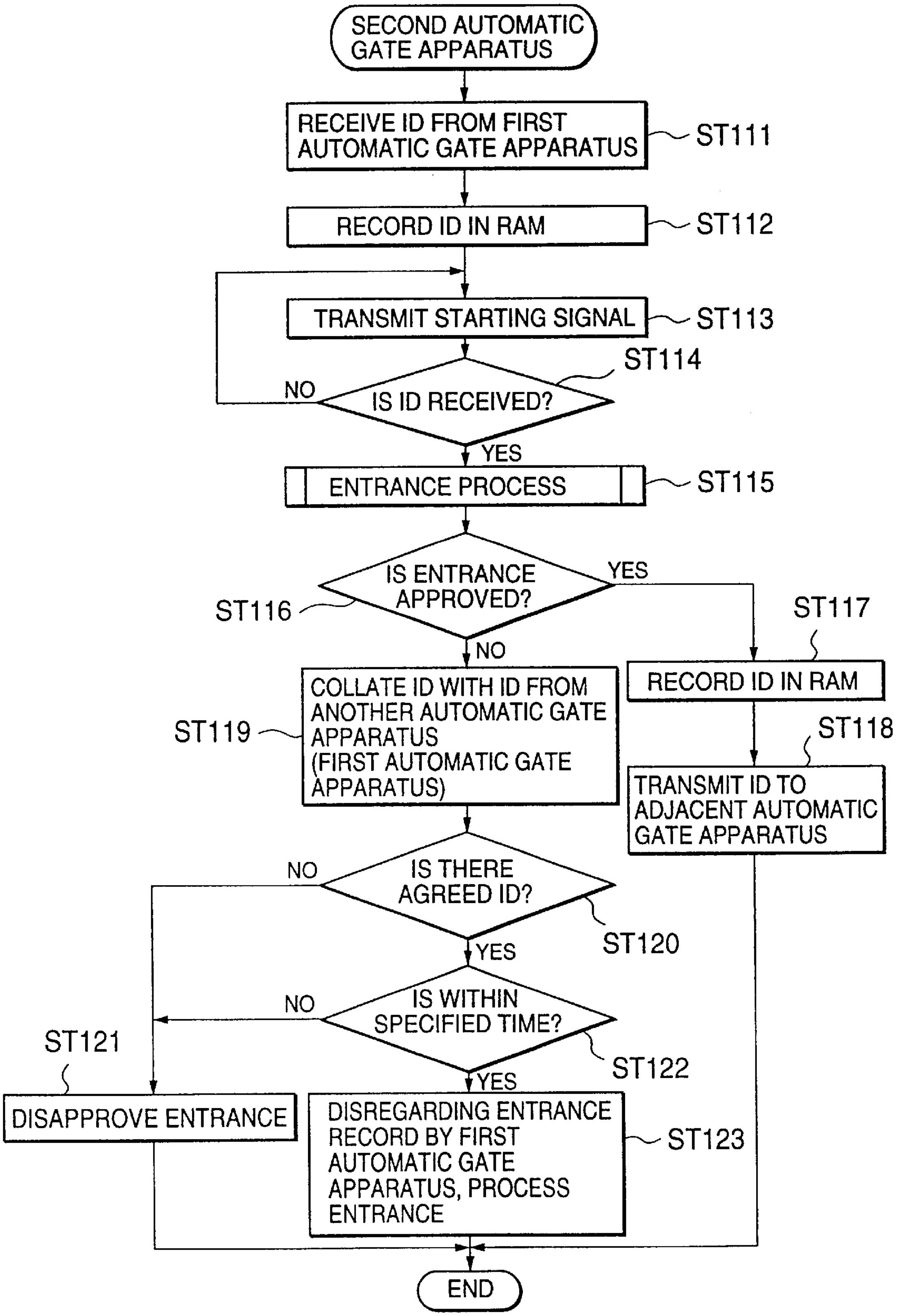
FIG. 12 is a flowchart for explaining the entrance process in a second automatic gate apparatus in the present invention.

On the other hand, upon receipt of the ID code transmitted from the first automatic gate apparatus as shown in FIG. 12 (Step 111), the CPU 20 of the second automatic gate apparatus records the received ID code in a memory such as the RAM 24 (Step 112).

Hereafter, a user enters into the passage formed with the second automatic gate apparatus and presents the wireless card 100 that is processed for entrance by the first automatic gate apparatus without entering into the passage formed with the first automatic gate apparatus. Then, the CPU 20 of the second automatic gate apparatus starts the wireless communication with the wireless card 100 corresponding to the starting signal being transmitted, receives the ID code of the wireless card 100 (Steps 113, 114) and executes the entrance process with the wireless communication with the wireless card 100 (Step 115).

At this time, the CPU 20 of the second automatic gate apparatus approves the entrance of a user when the wireless card 100 is not in the entrance state (Step 116), records the ID code in the RAM 24 (Step 117) and transmits the ID code to the adjacent automatic gate apparatus (Step 118).

Further, when the wireless card 100 is in the entrance state, the CPU 20 of the second automatic gate apparatus does not approve the entrance of a user (Step 116) and collates the ID code received from the wireless card 100 with the ID code recorded in the RAM 24 (Step 119). At this time, the ID code of the wireless card that is processed for entrance in the adjacent automatic gate apparatus and the ID code of the wireless card 100 that is entrance processed in the second automatic gate apparatus itself are recorded in the RAM 24.

By this collating process, the CPU 20 judges whether there is an ID code agreed with the ID code received from the wireless card 100 (Step 120). When there is no ID code agreed with the ID code received from the wireless card 100, the CPU 20 of the second automatic gate apparatus disapproves the entrance of the user (Step 121).

Further, when judging that there is an ID code agreed with the ID code received from the wireless card 100, the CPU 20 of the second automatic gate apparatus judges whether it is within a specified time from the time when the wireless card having the agreed ID code is processed (Step 122). When judged that it is not within the specified time, the CPU 20 of the second automatic gate apparatus disapproves the entrance of the user (Step 121).

Further, when judged that it is within the specified time, the CPU 20 of the second automatic gate apparatus executes the entrance process disregarding the entrance data recorded by the first automatic gate apparatus (Step 123). As a result of this judgement, when the entrance of the wireless card 100 is approved, the user is able to enter through the passage formed with the second automatic gate apparatus.

Further, in the above example, the process is explained in a case wherein a user enters from the second automatic gate apparatus adjacent to the first automatic gate apparatus using a wireless card that was once entrance processed in the first automatic gate apparatus. However, not limiting to this, when entering through the first automatic gate apparatus again using a wireless card that was once entrance processed in the first automatic gate apparatus, a user is approved to enter likewise above if it is within the specified time based on the ID code recorded in the RAM 24.

As described above, when a user enters into a station using a wireless card once processed for entrance although the user did not enter, the entrance using that wireless card is approved only for a specified time after the entrance process.

Thus, the entrance using the wireless card that was once processed for entrance is approved although no illegal entrance is intended and the convenience of user can be promoted.

Next, an embodiment of a transactions system to deal articles with a station stall installed in a station, etc. using money data recorded on a wireless card 100 will be explained.

Figure 13:
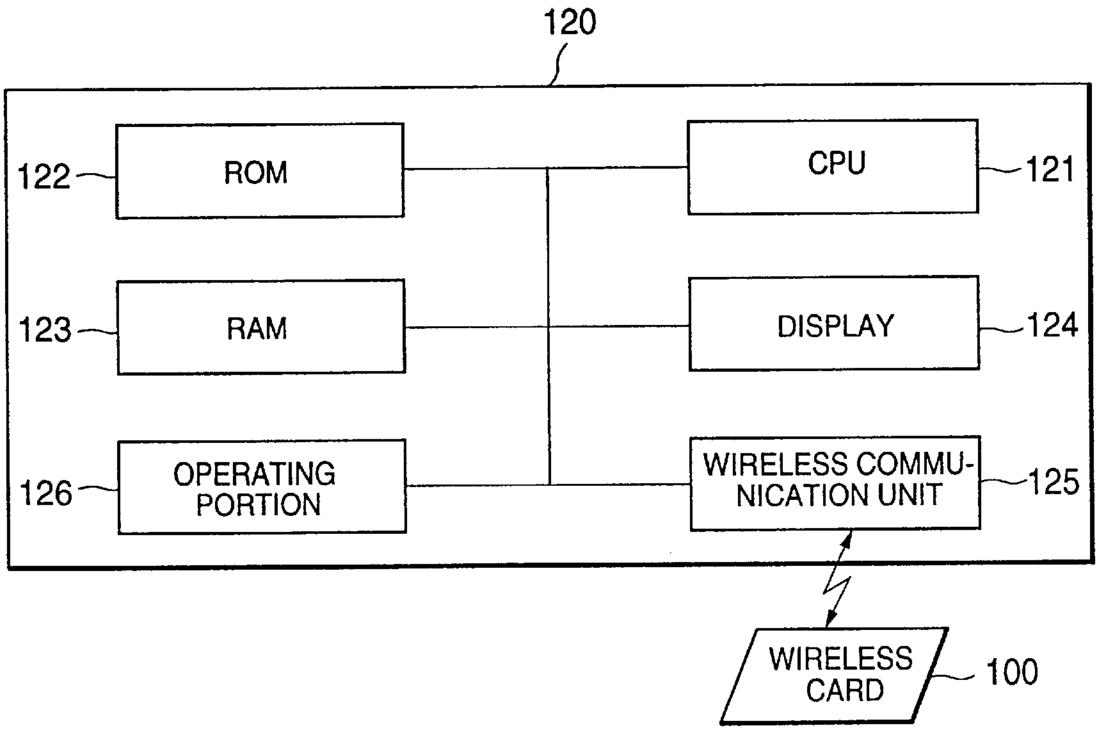
FIG. 13 is a block diagram showing the internal structure of a charge processor of a transaction system of the present invention.

FIG. 13 is a block diagram showing the structure of a charge processor 120 of a transactions system installed at a station stall, etc.

As shown in FIG. 13, the charge processor comprises a CPU 121, a ROM 122, a RAM 123, a display 124, a wireless communication unit 125, an operating portion 126, etc.

Figure 14:
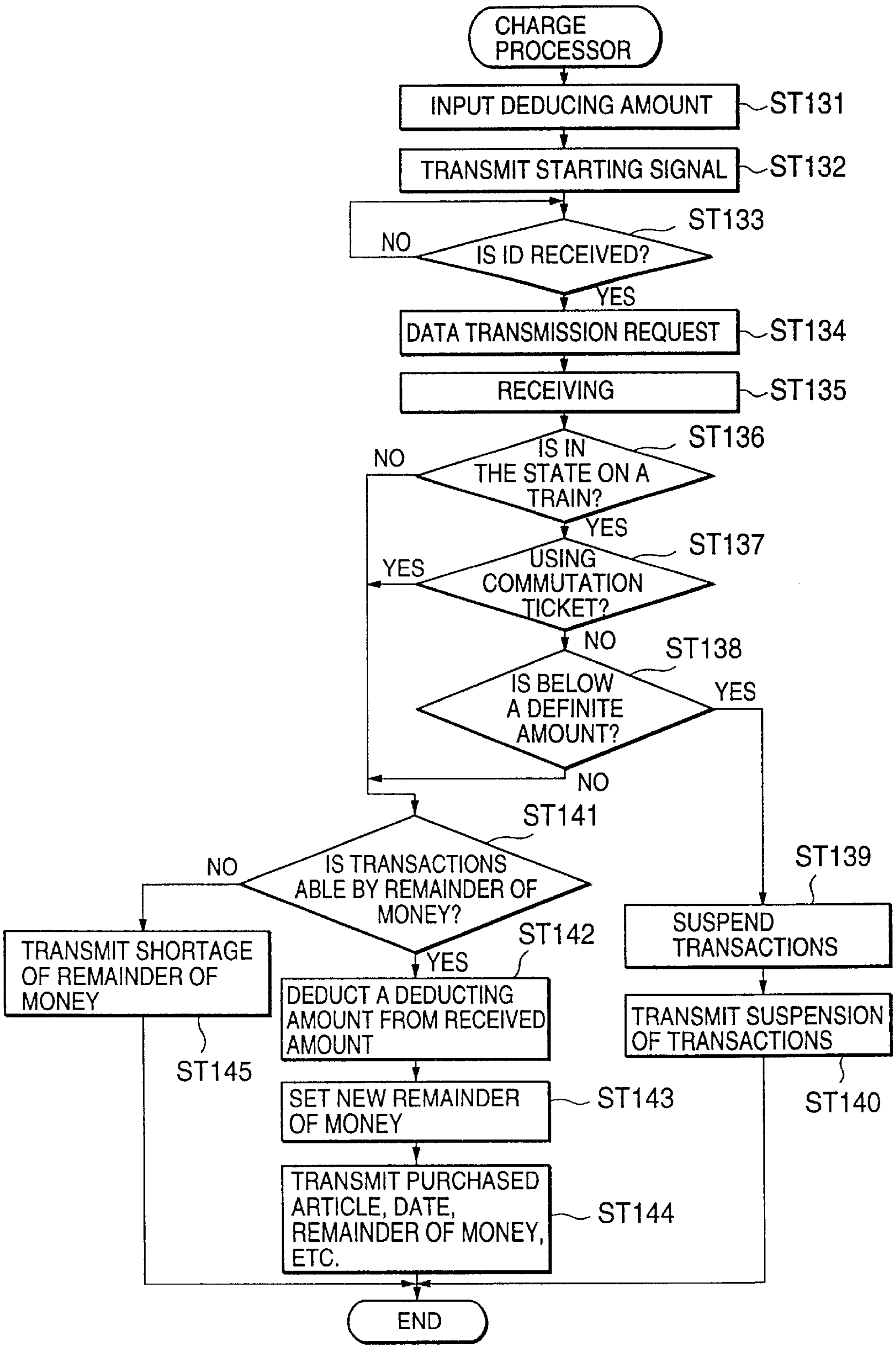
FIG. 14 is a flowchart for explaining an article transaction process in the charge processor of the present invention.

Next, the operation of the charge processor 120 when purchasing articles at a station stall in a station yard using a wireless card 100 will be explained referring to flowcharts shown in FIG. 14 and FIG. 15.

When purchasing articles at a station stall in a station, a user presents a wireless card 100 that has an SF card function as a money data for a purchasing money. The station stall inputs a deduction amount as a charge for purchased articles into the charge processor 120 through the operating portion 126 (Step 131). The CPU 121 of the charge processor 120 transmits a starting signal by the wireless communication unit 125 (Step 132). When the wireless communication unit 125 received an ID card from the wireless card 100 in response to this starting signal (Step 133), the CPU 121 transmits a data transmission request by the wireless communication unit 125 (Step 134).

When data transmitted from the wireless card 100 is received (Step 135) in response to this data transmission request, the CPU 121 judges whether the wireless card 100 is in the state of getting on a train according to whether it is in the entering state (Step 136). When judging that the wireless card 100 is in the state of getting on a train, the CPU 121 judges whether it is in the state of getting on a train as a commutation ticket (Step 137). And when judged that it is in the state of getting on a train as a commutation ticket, the CPU 121 judges whether the remainder of money of the money data is less than a preset specified definite amount (Step 138). When judged the remainder of money is judged to be less than a specified definite amount, the CPU 121 judges to suspend the transactions because of the less remainder of money (Step 139) and transmits a message to suspend the transactions due to the remainder of money less than the specified amount to the wireless card 100 (Step 140). A specified amount that is compared with the remainder of money in Step 138 is a preset amount or set a specified amount of first fare. Thus, it is prevented that a user cannot exit using the SF card as a result of purchase of articles.

Further, when judged that it is not in the state of getting on a train in Step 136, or judged that it is in the state of getting on a train as a commutation ticket in Step 137 or judged that the remainder of money as the SF card is more than a specified amount in Step 138, the CPU 121 judges whether the transactions is possible by comparing a deduction amount (an article purchased amount) with the remainder of money (Step 141). Further, by suspending the transactions using a wireless card that is not in the state of getting on a train, the use of a wireless card for purchasing articles may be restricted to only a wireless card that is in the state of getting on a train; that is, the purchase of articles in a station yard. As a result, it becomes possible to restrict the use of a wireless card for purchasing articles.

When judging that the transactions is possible according to the remainder of money on a wireless card 100, the CPU 121 deducts a deduction amount from the remainder of money received from a wireless card 100 (Step 142), sets a new remainder of money (the remainder of money after the transactions) (Step 143) and transmits the process contents including a name of purchased article, date of purchasing, remainder of money, etc. to a wireless card 100 (Step 144). Further, when judging that the transactions is not possible due to the remainder of money on a wireless card 100 less than the deduction amount in Step 141, the CPU 121 judges the suspension of transactions due to the shortage of the remainder of money and a message stating that the transactions is not possible due to the shortage of the remainder of money to a wireless card 100 (Step 145).

Figure 15:
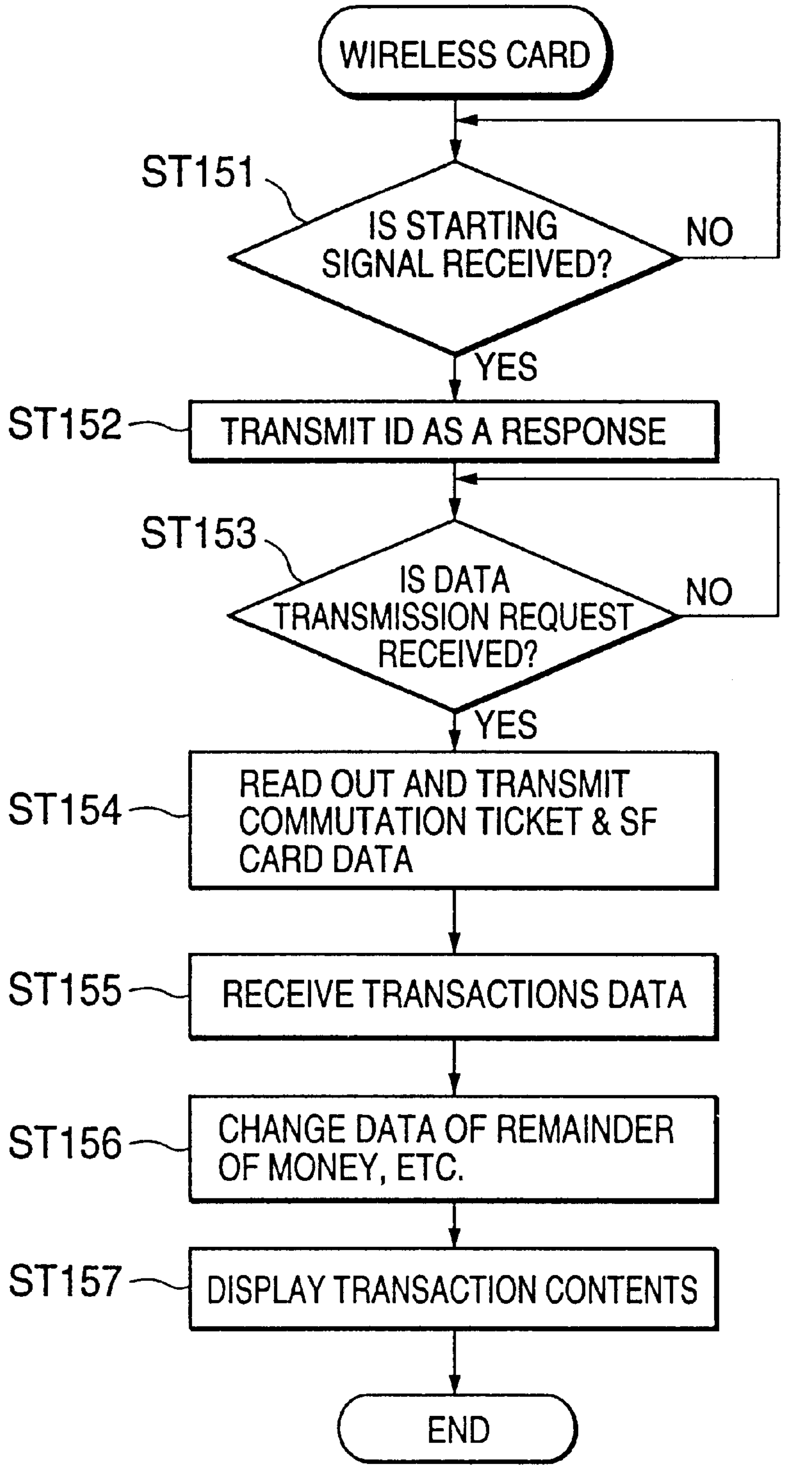
FIG. 15 is a flowchart for explaining the action of a wireless card corresponding to the article transactions process of the charge processor of the present invention.

Corresponding to the above-mentioned process, in a wireless card 100, the process shown in FIG. 15 is executed. That is, when a starting signal is received from the charge processor 120 (Step 151), the CPU 102 of the wireless card 100 transmits an ID code in response to the starting signal (Step 152).

Further, when a data transmission request is received from the charge processor 120 (Step 153), the CPU 102 reads out an entrance data jointly with a commutation ticket data and money data as the data of the wireless card when it is in the entered state and transmits them to the charge processor 120 as the wireless card data (Step 154).

Thereafter, when receiving the process result from the charge processor 120 (Step 155), the CPU 102 changes the remainder of money that is the money data of the wireless card 100 according to the contents of that transactions (Step 156) and records the contents of transactions in a memory such as the RAM 106, etc. Further, the CPU 102 displays the contents of transactions on the display 116 and terminates the transactions process.

The display on the display 116 may be erased after a specified time or erased when the process for next wireless card 100 is executed.

Further, such the transactions contents as shown above may be displayed on the display 116 as a using history by operating the operating portion 114. In this case, the using history may be displayed as the using history of a wireless card together with the history of the contents of the above-mentioned ticket examination process or as the using history of the article transactions only.

In the above example, when the entrance process is performed using the SF card function, the remainder of money after purchasing an article is compared with a preset amount when purchasing an article and the transactions is suspended when the remainder of money becomes less than a definite amount. However, even when the remainder of money decreases to below a definite amount, the transactions is not suspended and a guidance showing that the remainder of money becomes short when exiting may be displayed on the display 125 of the charge processor 120 or the display 116 of a wireless card 100. Further, when the transactions is suspended, the guidance showing that the remainder of money becomes short when exiting may be displayed on the display 125 of the charge processor 120 or the display 116 of a wireless card 100.

Further, for a wireless card having both functions of a commutation ticket and SF card, the above-mentioned definite amount that is compared with the remainder of money of the SF card when entered using a wireless card as an SF card may be made as a using fare from an entered station to the section of a commutation ticket when a station where a station stall from which articles are purchased is an entered station. Because users often use station stalls at an entered station, an exit station or a junction station, when a user entered from a station outside the section of a commutation ticket, a fare of an SF card to the section of a commutation ticket is set as a definite amount and the shortage of the remainder of money at the time of exit can be reduced.

Further, when a station wherein an article purchasing station stall is installed is different from an entered station, it is expected that a user may exit from that station and therefore, when a user exits from that station, the above-mentioned definite amount may be treated as a used amount from the entered station to that station wherein the station stall is installed. Thus, the shortage of the remainder of money at the time of exit can be reduced.

As described above, it is enabled to purchase articles using a wireless card having an SF card function and versatility and convenience of a wireless card that is used as a commutation ticket can be improved.

Further, when an article is purchased using a wireless card as an SF card, if the remainder of money on the wireless card decreased to below a specified definite amount after purchasing an article when the wireless card is in the state of getting on a train, a guidance showing that the remainder of money becomes short when exiting a station is displayed. Thus, it is possible to prevent the remainder of money from becoming short at the time of exit because of the purchase of articles.

As described above in detail, according to the present invention, it is possible to provide a wireless recording medium, a gate system and a transactions system that enables a user to check the contents of use of a wireless recording medium easily.

What is claimed is:

1. A wireless recording medium for communicating with an automatic gate apparatus including communication means for communicating with the wireless recording medium in which gate data is stored; first processing means for processing the gate data received by the communication means to judge approval/disapproval of passage; and second processing means for transmitting a processed content after executing the gate data processed by the first processing means, the wireless recording medium comprising:

storage means for storing communication ticket data showing a usable section and money data showing a specified usable amount;

transmission means for transmitting the communication ticket data and the money data stored in the storage means to the communication means of the automatic gate apparatus;

receiving means for receiving the processed content transmitted from the second processing means of the automatic gate apparatus, the processed content indicating that the communication ticket data is used when the first processing means judges the approval of passage based on the communication ticket data and indicating that the money data is used when the first processing means judges the approval of passage based on the money data; and displaying means for performing a first display indicating that the communication ticket data is used when the first processing means judges the approval of passage based on the communication ticket data and a second display, which is a different format from the first display, indicating that the money data is used when the first processing means judges the approval of passage based on the money data.

2. A wireless recording medium as claimed in claim 1, wherein the displaying means performs the first display and second display when the first processing means judges the approval of passage based on the communication ticket data and the money data.

3. A wireless recording medium as claimed in claim 1, wherein the displaying means includes a first indicator that performs the first display and a second indicator that performs the second display.

4. A wireless recording medium as claimed in claim 1, further comprising:

means for automatically stopping the performing of the first display and second display at a specified time after performing the first display and the second display by the displaying means.

5. A gate system comprising a wireless recording medium that records gate data, an automatic gate apparatus that executes a gate processing by a wireless communication with the wireless recording medium, and the wireless recording medium comprises:

storage means for storing communication ticket data showing a usable section and money data showing a specified usable amount; and transmission means for transmitting the communication ticket data and the money data stored in the storage means to communication means of the automatic gate apparatus, and wherein the automatic gate apparatus comprises:

the communication means for receiving the communication ticket data and the money data by the wireless communication with the wireless recording medium;

first processing means for judging whether the wireless recording medium is used in an effective section based on the communication ticket data received from the wireless recording medium by the communication means; and second processing means for generating a first information representing that the using of the wireless recording medium based on the communication ticket data when the first processing means judges that the wireless recording medium is used in the effective section;

third processing means for generating a second information representing that the using of the wireless recording medium based on the money data when the first processing means judges that the wireless recording medium is not used in the effective section;

fourth processing means for transmitting the first and second information generated by the second and third processing means; and wherein the wireless recording medium further comprises:

receiving means for receiving the first and second information from the fourth processing means of the automatic gate apparatus; and displaying means for performing a first display indicating the first information and a second display indicating the second information in response to information generated by one of the second and third processing means, respectively.

6. A gate system as claimed in claim 5, wherein the wireless recording medium further comprises:

directing means for directing a displaying operation by the displaying means.

7. A gate system comprising a wireless recording medium that records gate data, an automatic gate apparatus that executes a gate processing by a wireless communication with the wireless recording medium, wherein the wireless recording medium comprises:

storage means for storing communication ticket data showing a usable section, money data showing a specified usable amount and entrance data showing an entering the system; and transmission means for transmitting the communication ticket data, the money data and the entrance data stored in the storage means to communication means of the automatic gate apparatus, wherein the automatic gate apparatus is installed at an exit of the system, and comprises:

communication means for receiving the communication ticket data, the money data and the entrance data by the wireless communication with the wireless recording medium;

first processing means for judging whether the wireless recording medium is used in an effective section based on the communication ticket data and the entrance data received from the wireless recording medium by the communication means;

second processing means for generating a first information representing that the using of the wireless recording medium based on the communication ticket data when the first processing means judges that the wireless recording medium is used in the effective section;

third processing means for generating a second information representing that the using of the wireless recording medium based on the money data when the first processing means judges that the wireless recording medium is not used in the effective section;

fourth processing means for generating a third information representing the using of the wireless recording medium based on both of the communication ticket data and the money data when the first processing means judges that the wireless recording medium is used in the effective section and non-effective section added to the effective section by which the entrance data or the exit of the system is adapted to out of the effective section of the communication ticket data; and fifth processing means for transmitting the first, second and third information generated by the second, third and fourth processing means, respectively and wherein the wireless recording medium further comprises:

receiving means for receiving the first, second and third information from the fifth processing means of the automatic gate apparatus; and displaying means for performing a first display indicating the first information, a second display indicating the second information, and a third display indicating the third information in response to information generated by one of the second, third, and fourth processing means, respectively.

8. An entrance gate system comprising a first automatic gate apparatus and second automatic gate apparatus which is provided adjacently to the first automatic gate apparatus and connected with the first automatic gate apparatus through communication circuits, which receive gate data through a wireless communication with a wireless recording medium in which at least ID code and the gate data are stored, judge an approval/disapproval of entrance, and transmit the result of judgment to a wireless recording medium, wherein:

the first automatic gate apparatus comprises:

first communication means for executing the wireless communication with the wireless recording medium in a first communication range;

first processing means which receives gate data from the wireless recording medium through the wireless communication with the wireless recording medium in the first communication range by the first communication means and when the entrance is approved based on the received gate data, for transmitting the entrance data to the wireless recording medium; and transmission means for transmitting the ID code of the wireless recording medium to which the entrance data is transmitted by the first processing means to the second automatic gate apparatus via the communication circuit, and the second automatic gate apparatus comprises:

second communication means for executing the wireless communication with the wireless recording medium in a second communication range;

first judging means for judging whether the ID code of the wireless recording medium is the same as the ID code transmitted by the transmission means when entrance data is recorded on the wireless recording medium through the wireless communication with the wireless recording medium in the second communication range by the second communication means;

second judging means for judging whether it is within a specified time after the ID code is transmitted by the transmission means when the ID codes are judged to be the same by the judging means;

second processing means for approving the entrance using the wireless recording medium disregarding the entrance data transmitted at the time of entrance processing by the first processing means of the first automatic gate apparatus when the second judging means judges that entrance is within the specified time; and third processing means for disapproving the entrance using the wireless recording medium when the second judging means judges that the entrance is not within the specified time.

9. A transaction system comprising a wireless recording medium that is used in a gate processing executed by an automatic gate apparatus and records money data and an information showing the state of getting on a transportation vehicle and a charge processor that executes the transactions of articles based on the money data recorded in the wireless recording medium, wherein:

the charge processor comprises:

input means for inputting a charge of article;

communication means for executing a wireless communication with the wireless recording medium;

first receiving means for receiving money data and the information showing the state of getting on a transportation vehicle from the wireless recording medium by the communication means;

first judging means for judging whether the wireless recording medium is in use state of getting or not;

second judging means for judging whether the remainder of money on the wireless recording medium after deducted a charge of article that is input by the input means from the remainder of money of the received money data is below the specified amount when the first judging means judges the wireless recording medium is in use of getting state;

third judging means for judging whether the money data received by the first receiving means above the charge of article when the first judging means judges the wireless recording medium is not in use state of getting;

suspending means for suspending the transactions of article when judged that the remainder of money is below a specified amount by the second judging means;

approving means for approving the transactions of article when judged that the remainder of money is above the specified amount by the second judging means or judged the money data received by the first receiving means above the charge of article by the third judging means; and third processing means for transmitting transaction data including at least a charge of article to the wireless recording medium by the wireless communication means, the wireless recording medium comprises:

second receiving means for receiving the transaction data transmitted by the third processing means of the charge processor; and changing means for changing the remainder of money of the money data according to the transaction data received by the second receiving means.

10. A transaction system as claimed in claim 9, wherein the suspending means includes display means for displaying that the remainder of money will become short when exiting through the automatic gate apparatus.

11. A transaction system as claimed in claim 9, wherein the wireless recording medium further comprises:

display means for displaying a transaction contents based on the transaction data received by the second receiving means.

12. A wireless device for communicating with a wireless communication apparatus including communication means for making a wireless communication; first processing means for judging a propriety of use based on a using data received by the communication means; and a second processing means which transmits a content data that is processed by the first processing means by the communication means, comprising:

storage means for storing a first using data showing that the wireless device can be used when fulfilling a specified condition and a second using data showing that the wireless device can be used when not fulfilling the specified condition;

transmission means for transmitting the first and second using data stored in the storage means to the communication apparatus;

receiving means for receiving the content data comprising a first judging data showing that the first using data is used when the first processing means judges as usable the wireless device based on the first using data and a second judging data showing that the second using data is used when the first processing means judges as usable the wireless device based on the second using data; and displaying means for displaying a first content showing that the first processing means judges a using based on the first using data when the receiving means receives the first judging data and displaying a second content showing that the first processing means judges a using based on the second using data when the receiving means receives the second judging data.

13. A wireless recording medium for communicating with an automatic gate apparatus including a communication unit for communicating with the wireless recording medium storing in which gate data is stored; a first processing unit that processes the gate data received by the communication unit to judge approval/disapproval of passage; and a second processing unit that transmits a processed content after executing the gate data processed by the first processing unit, the wireless recording medium comprising:

a RAM and a ROM that stores gate data comprising communication ticket data showing a usable section and money data showing a specified usable amount;

a transmitter that the communication ticket data and the money data stored in the RAM and/or the ROM to the communication unit of the automatic gate apparatus;

a receiver that receives the processed content transmitted from the second processing unit of the automatic gate apparatus, the processed content indicating that the communication ticket data is used when the first processing unit judges the approval of passage based on the communication ticket data and the processed money data indicating that the money data is used when the first processing unit judges the approval of passage based on the money data; and a display that performs a first display indicating that the communication ticket data is used when the first processing unit judges the approval of passage based on the communication ticket data and a second display, which is a different format from the first display, indicating that the money data is used when the first processing unit judges the approval of passage based on the money data.

* * * * *

UNITED STATES PATENT AND TRADEMARK OFFICE

CERTIFICATE OF CORRECTION

PATENT NO. : 6,556,126 B1 Page 1 of 1
DATED : April 29, 2003
INVENTOR(S) : Katsuo Imazuka and Hisashi Yoshida It is certified that error appears in the above-identified patent and that said Letters Patent is hereby corrected as shown below:

Column 18,
Line 6, change "communication ticket data" to -- commutation ticket data --.
Lines 5-10, change "communication ticket data" to -- commutation ticket data --.
Line 16,18, 23, 25, 33, 50, 53-54, 58-59, and 63, change "communication ticket data" to -- commutation ticket data --.

Column 19,
Lines 1-2, 33, 37-38, 43-44, 49, 54-55, and 66-67,change "communication ticket data" to -- commutation ticket data --.

Column 20,
Lines 5-6, change "communication ticket data" to -- commutation ticket data --.

Column 22,
Line 40, 42, 48, 50, and 55, change "communication ticket data" to -- commutation ticket data --.

Signed and Sealed this

First Day of June, 2004

JON W. DUDAS
*Acting Director of the United States Patent and Trademark Office*